April 17, 1934.  E. A. KELLY  1,955,369

DEPOSIT COUPON BOOK

Filed Sept. 19, 1931  2 Sheets-Sheet 1

INVENTOR.
EDWARD A. KELLY.
BY
ATTORNEYS.

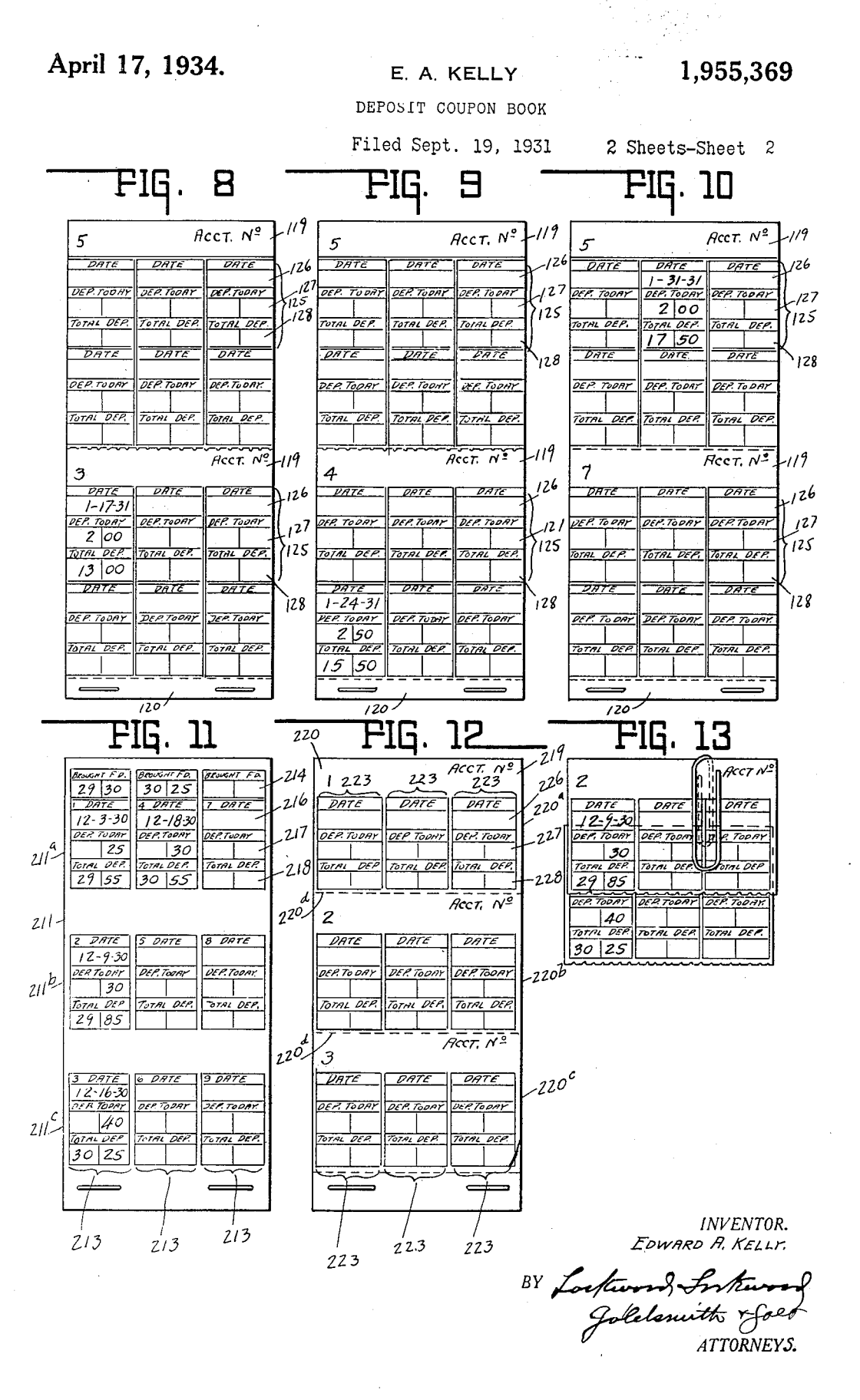

April 17, 1934.  E. A. KELLY  1,955,369
DEPOSIT COUPON BOOK
Filed Sept. 19, 1931  2 Sheets-Sheet 2

Patented Apr. 17, 1934

1,955,369

UNITED STATES PATENT OFFICE 1,955,369

DEPOSIT COUPON BOOK

Edward A. Kelly, Indianapolis, Ind.

Application September 19, 1931, Serial No. 563,759

5 Claims. (Cl. 282—23)

This invention relates to what is known as the deposit coupon book which contains a receipt form and a plurality of deposit coupons.

The chief object of this invention is to simplify and consolidate deposit coupon books and to arrange the receipt form and the deposit coupons so that consecutive additions are possible, so that the loss or destruction of deposit coupons may be readily noted, and so that detached successive coupons may be arranged for successive addition.

The full nature of the invention will be understood from the accompanying drawings and the following description and claims:—

In the drawings, Fig. 1 is a perspective view of a deposit coupon book embodying the invention and the front cover is turned back, exposing the receipt form herein adapted to be utilized with eight coupons.

Fig. 2 is a front view of a deposit coupon for the first deposit and properly filled out and detached.

Fig. 3 is a front view of deposit coupon #2 properly filled out and detached.

Fig. 4 is a front view of deposit coupon #3 properly filled out and detached, the receipt form shown in Fig. 1 being similarly filled out for the three deposits made and represented by the detached coupons shown in Figs. 2, 3 and 4.

Fig. 5 is a front view, with the cover removed, of a coupon book, wherein the coupons are arranged two to the page and successively arranged in column formation.

Fig. 6 is a front view of the first deposit coupon sheet immediately behind the receipt form, showing deposit coupons #1 and #3 exposed.

Fig. 7 is a similar view with deposit coupon #1 removed and the entry for deposit coupon #2 properly entered thereon.

Fig. 8 is a similar view representing deposit coupon #3 properly filled out and coupons #1 and #2 detached.

Fig. 9 is a similar view of deposit coupon #4 properly filled out, with deposits coupons #1, 2 and 3 detached and exposing coupon #5.

Fig. 10 is a similar view showing coupon #5 properly filled out and with coupons #1 to 4 inclusive, removed and with coupon #7 exposed.

Figs. 5 to 10 inclusive, are representative of a coupon book wherein the coupons are arranged two to the page.

Fig. 11 is a view similar to Fig. 5 and of a receipt form, the cover being removed for a coupon book arranged three to the page and with the successive deposits successively arranged in column relation.

Fig. 12 is a similar view of the first coupon sheet back of the receipt form and illustrates coupons #1, 2 and 3 previous to filling out the same.

Fig. 13 is a perspective view of the operation performed by the receiving teller in checking the additions upon receipt of coupon #3 from the initial receiving teller.

In Figs. 1 to 4 of the drawings, there is illustrated a deposit coupon book of the character herein designated as one to the page, that is there is one deposit coupon to each page or sheet in the book. The book includes a plurality of deposit coupons 10, a receipt form sheet 11 and preferably a cover 12.

In the present illustration, eight deposit coupons are utilized with one receipt form and immediately therebeneath, is another receipt form superimposed upon another series of eight coupons, and so on. Each receipt form is divided into a plurality of columns 13, positioned side by side and transversely divided, the first division and uppermost division being first designated "brought forward" and indicated in Fig. 1 by the numeral 14. Immediately therebeneath are the respective deposit areas successively numbered and the same are indicated at 15, and in Fig. 1 there are two in each column. Each deposit entry area includes an upper space 16 for the date, a lower space 17 for the deposit made on that date and a total receiving space 18, representing the total deposit to date.

Deposit coupon on #1 is positioned immediately beneath receipt form #1 and each deposit coupon includes an account number and a coupon number, the former being indicated at 19 and the latter at 20.

Similarly, each coupon has formed thereon, a registrable arrangement of columns 23 and unit deposit areas 25, each of which includes a date receiving portion 26, a deposit receiving portion 27 and a total receiving portion 28, the same registering respectively with the columns 13, the unit spaces 25, the date spaces 26, the individual deposit spaces 27 and the total deposit spaces 28 of the receipt form.

When the first deposit is made, a carbon sheet is inserted between the receipt form and deposit coupon #1 and the amount deposited that day is entered in the proper space 27, then the total is also entered, and then finally the date is entered. With this procedure, therefore, there is no possibility of adding in the date as a part of the total or deposit. The entry made initially upon the receipt form is reproduced by carbon paper on coupon #1 and the same is shown in Fig. 2 and said figure represents the coupon after it has been detached from the coupon book.

When the second deposit is made, the amount deposited is entered in the proper space 27 in the area designated "2" of the receipt form and then that deposit is added to the total upon the area for deposit #1, and it will be noted that two are aligned and addition is relatively easy and foolproof. Thereafter the date of the deposit is entered in the second deposit area and then coupon #2 is detached and contains the same data as a receipt form and said detached coupon is shown in Fig. 3.

When the third deposit is to be made, the person receiving the deposit enters the total found at the bottom of column #1 at the top of column #2 of the receipt form and enters it therein in the space 14 provided therefor. The third deposit is entered in the proper space 17 of the third deposit area and the total entered in the space 18 of the third deposit area and thereafter the date is inserted in the third deposit area 16. Coupon #3 is then detached and the data thereon corresponds to that found on the receipt form in the receipt form area for deposit #3. Similar and successive deposits are similarly entered and the successive coupons detached from the coupon book. Each deposit coupon is mailed to the receiving bank by the teller who receives the deposit initially and he makes the entry on the deposit books.

As shown in Fig. 13 with reference to a modified form of the invention, the following procedure may then be followed by the bank. Coupon #1 is superimposed upon coupon #2 when the second one is received and the lower edge of coupon #1 covers the date of coupon #2. The addition is readily checked because the last total and the new deposit together with the new total are the three lowermost superposed figures. When coupon #2 is received, coupon #1 may be destroyed. Coupon #2 is superimposed on coupon #3 and offset to the right one column and the lower edge of coupon #2 lies below the date of coupon #3 and this then positions the previous total above the new deposit and the new total therebeneath may be readily checked therefrom. Successive checkings are similarly made and all that need be retained by the bank in the active files is the last coupon received. The others may be successively stored until the entire book has been exhausted. This type of deposit book is adaptable to intermittent or regular deposit arrangements and is peculiarly adaptable to so-called school saving bank systems.

When coupon #8 has been fully made out and detached, the total found in the lower right hand corner of the receipt form is then transferred to the space 14 in the first column of the second receipt form which will then be immediately positioned below the first receipt form.

An improper entry upon the wrong receipt form is thus positively prevented, because until all of the deposit coupons #1 to #8 in the present form of the invention are utilized, receipt form #2 is not exposed and all the time that coupons #9 to #16 are being utilized, receipt form #1 will be entirely filled and available for entry, while receipt form #2 will be the only other receipt form that is exposed above the deposit coupons. Upon entry of deposit #16, the total is carried forward from receipt form #2 to receipt form #3 which is exposed by the removal of coupon #16.

The foregoing constitutes a complete description and explanation of the so-called one-to-the-page deposit coupon book.

In Figs. 5 to 10 inclusive, there is illustrated the two-to-the-page deposit coupon book and Fig. 5 illustrates the first receipt form. This receipt form is adapted to accommodate twelve deposits. This deposit book is larger than the deposit book shown in Fig. 1. The deposit book shown in Fig. 1 is of the conventional size of about 2½"×3½" which may be readily carried in a woman's purse.

For the reasons set forth hereinafter, each receipt form, arranged to accommodate twelve deposits, is only associated with six succeeding deposit coupon sheets, since each deposit coupon sheet has formed thereon two deposit coupons. These deposit coupons are arranged in a predetermined order, to wit, sheet #1 behind receipt form #1, includes deposit coupons #1 and #3, while sheet #2 therebeneath includes deposit coupons #2 and #4. Sheet #3 includes deposit coupons #5 and #7 and sheet #4 includes deposit coupons #6 and #8. Sheet #5 includes deposit coupons #9 and #11 and sheet #6 includes deposit coupons #10 and #12.

Beneath sheet #6, if more than twelve deposits are desired to be accommodated by the book, is a second receipt form, and six deposit coupon sheets similarly arranged and adapted to accommodate deposits #12 to #24 inclusive. If deposits are to be made weekly over a period of approximately a year, four receipt forms and associated groups of deposit coupons are employed, making a total of four sheets of receipt forms and twenty four sheets of deposit coupons, all the latter of which are numbered consecutively in the staggered manner set forth.

111 indicates the receipt form and the same is divided into an upper portion 111a and a lower portion 111b. The upper and lower portions are provided with columns 113 and the top of the receipt form includes a transverse space 114 to receive the carried balances or the amounts brought forward. Each column includes the unit deposit areas 115, of which there are four, and arranged in superposed relation. Each deposit area includes a date receiving space 116, a deposit receiving space 117 and a total deposit receiving space 118. All of the aforesaid is shown in Fig. 5.

Fig. 6 illustrates the first deposit coupon sheet and 120 indicates the same. The coupon is divided approximately at its midportion and is perforated as at 120a forming two united but readily severable deposit coupon portions 120b and 120c. Each coupon portion includes an upper space 119 which has indicated thereon the account number and the deposit coupon number.

Each coupon portion has a plurality of columns 123 arranged side by side and each column includes a plurality of deposit spaces 125. Each unit deposit area includes a date receiving space 126, the unit deposit space 127 and a total deposit space 128.

A carbon sheet is inserted between the receipt form 111 and the deposit coupon sheet 120, and the first entry made on the receipt form is the deposit made at that time. The total is then also entered and then the date in the space marked #1. This is reproduced by the carbon sheet upon coupon #1, the outer half of sheet #1. Coupon #1 is then detached and forwarded with the deposit to the bank.

When the second deposit is being made, the amount deposited is entered in the deposit area marked #2 and in space 117 thereof and then this deposit is added to the total immediately thereabove and the total is entered in the total space 118 for unit area #2, as shown, and then the date of the second deposit is entered. The carbon reproduces this data on the innermost coupon portion of sheet #2, which is marked deposit coupon #2—see Fig. 7—and then coupon #2 is detached, exposing coupon #4. Detached coupon #2 and the second deposit are then forwarded to the bank. The receiving teller then superimposes coupon #1 upon coupon #2 in the manner shown in Fig. 13 and covers the date on coupon #2. The total of coupon #1 then may be readily and visually added to the deposit on coupon #2 and the total on coupon #2 verified. Coupon #1 may then be destroyed or removed and placed in a permanent file, coupon #2 representing the statement of the account to date and the last deposit, as well as the date thereof.

When the third deposit is made, the third deposit is entered in the coupon deposit area on the receipt form and marked #3, and the deposit area being indicated by the numeral 117. The last total thereabove is then added to the third deposit and the total is entered in the third total deposit area 118 after which the date of the deposit coupon is entered. The carbon sheet which has not been disturbed since its initial positioning behind the receipt form, has reproduced these entries on the inner half of deposit coupon sheet #1, which is numbered coupon #3—see Fig. 8—then coupon #3 is detached which exposes coupon #4 of deposit coupon sheet #2 through the carbon sheet. Deposit coupon #3 is forwarded to the bank where deposit coupons #2 and #3 are checked as previously described, and coupon #2 removed from the file.

Deposit #4 is similarly made and the entries recorded whereupon deposit coupon #4, as shown in Fig. 9, is detached and forwarded to the bank with deposit #4. Upon detachment therefrom, deposit coupon #3 is fully exposed and the same, as shown in Fig. 10, exposes coupons #5 and #7, coupons #6 and #8 of the next deposit coupon sheet being immediately therebeneath respectively. Similarly, deposit coupons #9 and #11 are therebeneath respectively and the next deposit coupon sheet includes deposit coupons #10 and #12 respectively.

When all of the twelve deposit coupons have been detached, the second receipt form is exposed and all of the spaces on the first receipt form are completely filled. The second receipt form has its deposit areas numbered 13 to 24 inclusive. The third receipt form therebeneath and separate from the second receipt form by the six deposit coupon sheets bearing deposit coupons #13 to #24 inclusive, is numbered 25 to 36 inclusive, respectively, etc.

After deposit coupon #4 has been detached and prior to entering on the receipt form deposit #5, the total of deposit #4 is carried forward and entered in the second column—see Fig. 5—and in the proper space 114 thereof. Deposit 5 is then entered and the two amounts are totaled with the total inserted in unit deposit area #5 space 118. Similarly, when deposit #9 is entered, the total from deposit area #8 is brought forward and entered into the space 114 of the third column. When deposit #13 is made, the last total on the page, to wit, the total deposit in deposit area 12, is transferred to the first column space 114 of receipt form #2 and the same procedure is followed thereafter on the second receipt form, etc. and for the third and fourth receipt forms, if utilized.

In Figs. 11 to 13 inclusive, another form of the invention is illustrated wherein three deposit coupons to the page are provided. Herein Fig. 11 indicates the receipt form 211, having three areas 211a, 211b and 211c. The receipt form includes the column arrangement 213, the upper portion of which includes the transverse portions 214 and each section 211a, 211b and 211c is arranged in unit deposit area, each of which includes a date receiving area 216 a deposit receiving area 217 and a total receiving area 218.

Sheet #2 which is deposit coupon #1—see Fig. 12—is divided into three areas, each of which is successively numbered. The deposit coupon sheet is indicated by the numeral 220, the upper area of deposit coupon #1 by the numeral 220a, deposit coupon #2 by 220b, and deposit coupon #3 by the numeral 220c. Each of the coupons in the sheet is arranged for detachment by the perforation 220d, which deposit coupon includes an upper area 219 which receives the coupon number and the account number data. Each coupon has arranged thereon a plurality of columns 223. Each coupon deposit area in each column includes the date receiving space 226, deposit receiving space 227 and the total receiving space 228.

The carbon sheet is inserted behind the receipt form and if the depositor has an account and this is the first deposit to be made in the new book, the total from the old book is entered in the space 214 on the receipt form and in the first column 213. The deposit is then entered and the same is totaled and the total is entered in the space 218 of unit or deposit area #1. The date of the deposit is then entered. This enters the same data upon coupon #1. Coupon #1 is then detached from deposit sheet #1 and the amount deposited with the coupon is delivered to the bank.

When the second deposit is made, the unit deposit is entered in space 217 thereof, the total entered in space 218 thereon and then the date is added. The carbon reproduces these entries on coupon #2, the intermediate portion of the deposit coupon sheet #1 immediately back of the receipt form. Deposit coupon #2 is then detached and forwardly to the bank with deposit #2 and the deposit total is checked with coupon #1 previously received by the bank, as indicated in Fig. 13, and as previously set forth.

When deposit #3 is made, the deposit is entered in the unit area #3 and in the space 217 and the last total is added thereto and entered in the space 218 and in space #3, and then the date is added. These entries are reproduced on coupon 213, the third and last portion of deposit sheet #1. This is then detached and forwarded to the bank with the deposit made. The bank then superimposes coupon #2 upon coupon #3 covering up the date of coupon #3 so that the three figures, to wit, total deposit of coupon #2, deposit of coupon #3 and the total of coupon #3 are superposed and may be readily and visually checked. This procedure is followed for all of the succesive deposits.

Herein the receipt form is arranged to accommodate nine deposits. It may be widened and another series or column provided whereupon the receipt form would accommodate twelve deposits, or it may be narrower and the receipt form only accommodating six deposits.

It will be noted with this form of the invention that the coupons are arranged in successive order, that is one, two and three to the page and the coupon #4 lies beneath coupon #1, coupon #5 lies beneath coupon #2 and coupon #6 lies beneath #3, etc.

In this form of the invention, three coupon sheets are used with one receipt form and after the 9th deposit coupon is removed, which removes the last portion of the coupon sheet, all of the receipt form areas will be filled up and then the second receipt form sheet will be exposed, the same being superimposed upon a similar number of successive coupon sheets and these are similarly numbered and similarly handled.

The invention claimed is:—

1. A deposit coupon book comprising a receipt-form-sheet containing a plurality of duplicate sets of receipt-form divisions, and a plurality of deposit coupon sheets, each provided with separable coupons, said deposit coupon sheets being arranged in superposed relation beneath the receipt-form-sheet, the coupons on each deposit-coupon-sheet corresponding in number to the number of the receipt-form-divisions on the receipt-form-sheet, each coupon containing deposit record devisions which are duplicates of and arranged to register with the receipt-form-divisions of the receipt-form-sheet, said receipt-form-divisions and said deposit-record-divisions being so arranged that duplicate entries may be made upon consecutively arranged sheet-form-divisions of the receipt-form-sheet and the registering deposit-record-division of a coupon, all of said divisions having indicia so arranged that each successive deposit entry may be added to the last preceding deposit entry at a position immediately below the total deposited credit indicated by said last mentioned entry.

2. A deposit coupon book including a plurality of sheets secured together at one end and comprising a single superposed receipt-form-sheet and a plurality of duplicate cooperating deposit-coupon-sheets of substantially similar size and successively positioned beneath the receipt-form-sheet, said coupon sheets and the receipt-form-sheet containing duplicate record spaces arranged in columns, each coupon sheet being transversely divided by scored line means to provide a plurality of separable coupons, the coupons being successively numbered with the first coupon of each coupon sheet numbered the same as the first coupon of the superposed coupon sheet increased by the number of coupons per coupon sheet, the duplicate record spaces being so positioned that they lie in superposed registering relation so that the coupon sheet portion which lies immediately beneath the receipt-form-sheet may receive entries simultaneously with the placing of said entries on the receipt-form-sheet.

3. A deposit coupon book including a plurality of sheets secured together at one end and comprising a single superposed receipt-form-sheet and a plurality of duplicate cooperating deposit coupon sheets of substantially similar size and successively positioned beneath the receipt-form-sheet, each coupon sheet being divided by scored line means to form a pair of separable coupons, the coupons of every alternate coupon sheet being odd numbered and the coupons of any intermediate coupon shown being even numbered, the numbering of one coupon of a superposed coupon sheet being greater by one than the number of the lowest numbered coupon sheet of the succeeding coupon sheet and less than one of the number of the other coupon of the succeeding coupon sheet, said coupons and the receipt-form-sheet containing duplicate record spaces arranged in columns and so positioned that they lie in superposed registering relation whereby the coupons which lie immediately beneath the receipt-form-sheet may receive entries simultaneously with the placing of said entries on the receipt-form-sheet.

4. A deposit coupon book comprising a plurality of duplicate sets of sheets secured together at one end, each set including a plurality of duplicate coupon sheets arranged in superposed relation and each coupon sheet being formed of a plurality of separable coupons, each coupon containing deposit-record-divisions, each set also containing a single receipt-form-sheet superposed upon the said deposit-coupon-sheets, the receipt-form-sheet containing divisions corresponding to the deposit-record-divisions of the coupons forming a deposit-coupon-sheet, the record division of the receipt form sheet and the deposit coupon sheets being arranged to lie in superposed registering positions, said receipt-form-divisions and said deposit-record-divisions being so arranged that duplicate entries may be made upon consecutively arranged sheet-form-divisions of the receipt-form-sheet of each set and the registering deposit record divisions of a coupon of the same set, all of said divisions having indices so arranged that each successive deposit entry may be added to the last preceding deposit entry at a position immediately below the total deposit credit indicated by said last mentioned entry.

5. A deposit-coupon-book comprising a plurality of coupon sheets, each provided with separable coupons and the sheets arranged in superposed relation, each coupon containing record divisions, and a receipt-form-sheet superposed upon each respective coupon sheet and also containing record divisions which are duplicates of the record divisions on the respective coupons and so arranged as to assume superposed registering positions with respect to the record divisions on said coupons, said receipt-form-divisions and the record divisions of said coupons being so arranged that duplicate entries may be made upon consecutively arranged receipt-form-divisions of the receipt-form-sheet and the registering record divisions of the coupons, all of said divisions having indicia so arranged that each successive entry on the receipt-form may be correlated to the last preceding entry thereon.

EDWARD A. KELLY.